Oct. 23, 1951 J. S. GOODWIN ET AL 2,572,332

APPARATUS FOR DETERMINING THE ANGULAR POSITIONS OF OBJECTS IN WELLS

Filed Oct. 15, 1945 8 Sheets-Sheet 1

Phillip Campbell,
John S. Goodwin,
INVENTORS

BY [signature]
ATTORNEY

Oct. 23, 1951 J. S. GOODWIN ET AL 2,572,332
APPARATUS FOR DETERMINING THE ANGULAR
POSITIONS OF OBJECTS IN WELLS
Filed Oct. 15, 1945 8 Sheets-Sheet 2

Phillip Campbell,
John S. Goodwin,
INVENTORS
BY [signature]
ATTORNEY

Phillip Campbell,
John S. Goodwin,
INVENTORS
BY [signature]
ATTORNEY

Phillip Campbell,
John S. Goodwin,
INVENTORS,
BY W. Hleapill
ATTORNEY

Oct. 23, 1951 J. S. GOODWIN ET AL 2,572,332

APPARATUS FOR DETERMINING THE ANGULAR POSITIONS OF OBJECTS IN WELLS

Filed Oct. 15, 1945 8 Sheets-Sheet 5

Phillip Campbell,
John S. Goodwin,
INVENTORS

BY [signature]

ATTORNEY

Oct. 23, 1951

J. S. GOODWIN ET AL 2,572,332

APPARATUS FOR DETERMINING THE ANGULAR POSITIONS OF OBJECTS IN WELLS

Filed Oct. 15, 1945

8 Sheets-Sheet 6

Phillip Campbell,
John S. Goodwin,
INVENTORS.

BY [signature]

ATTORNEY

Oct. 23, 1951 J. S. GOODWIN ET AL 2,572,332

APPARATUS FOR DETERMINING THE ANGULAR POSITIONS OF OBJECTS IN WELLS

Filed Oct. 15, 1945 8 Sheets-Sheet 7

Phillip Campbell,
John S. Goodwin,
INVENTORS

BY [signature]

ATTORNEY

Oct. 23, 1951 J. S. GOODWIN ET AL 2,572,332

APPARATUS FOR DETERMINING THE ANGULAR POSITIONS OF OBJECTS IN WELLS

Filed Oct. 15, 1945 8 Sheets-Sheet 8

Phillip Campbell,
John S. Goodwin,
INVENTORS

BY [signature]
ATTORNEY

Patented Oct. 23, 1951 2,572,332

UNITED STATES PATENT OFFICE 2,572,332

APPARATUS FOR DETERMINING THE ANGULAR POSITIONS OF OBJECTS IN WELLS

John S. Goodwin and Phillip Campbell, Whittier, Calif.

Application October 15, 1945, Serial No. 622,418

43 Claims. (Cl. 33—205)

Figure 1:
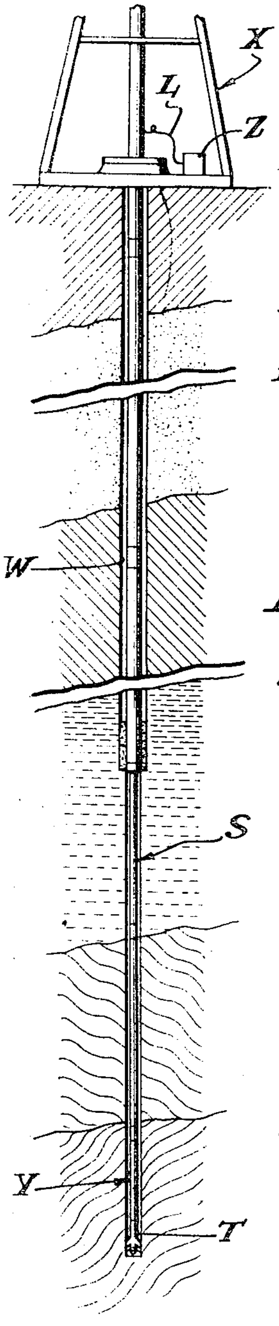

This invention is concerned with apparatus for determining the position of an object in a well, and it is a general object of the invention to provide for ascertaining, repeatedly if necessary, the position or angle of an object in a well without seriously interfering with ordinary well operations and also without materially complicating or interfering with the usual well drilling operations.

It has long been recognized as desirable to survey objects in a well, for instance, to determine the position or angle of a certain object in a well, and numerous arrangements and devices have been proposed for such use. Broadly, it is desirable during the course of drilling a well to survey the drilling tool to ascertain the direction in which it is penetrating the formation. A survey may involve the determination of the angle at which the tool is located and also the direction in which it is inclined, if it is inclined. The latter determination, however, is not, generally, as important as the first, for in the course of ordinary drilling it is desired to keep the hole straight and perpendicular and consequently correction is made whenever any deflection is made from such direction.

The devices, method and equipment heretofore proposed for surveying or determining the position of an object in a well bore have been generally characterized by complicated, delicate parts and by the fact that whatever instrument is used must be run into and out of the well in order to make a reading. In the case of a well being drilled the usual operation necessitates running some sort of an instrument down through the drill pipe while the drill string is idle, allowing a reading to be made and then withdrawing the instrument while the drill pipe still remains idle, all with the result that there is a substantial loss of time which is highly important and may be dangerous under some drilling conditions. Another manner of manipulation is the withdrawal of the drill string to allow an instrument to be run into the well bore to survey it, and then the return of the drill string all of which not only involves a considerable loss of time but a substantial expenditure of work.

It is a general object of the present invention to provide an apparatus for generating a signal, preferably in the form of mechanical vibrations in a well, and of a character or at a frequency determined by the position of the part to be surveyed, and which vibrations are ascertainable at the top of the well. We preferably generate strong or distinct mechanical vibrations at or in the vicinity of the part being surveyed, which vibrations are of a low frequency and we may employ an ordinary electrical amplifying apparatus such as a vacuum tube amplifier at the top of the well to pick up such vibrations and amplify them, making them audible or recordable. The frequency of the vibrations is determined by the angle or position of the part being surveyed and thus it is extremely simple for an operator to quickly ascertain the exact angle or position of the object in the well.

It is a general object of the present invention to provide a simple, practical dependable mechanism for generating vibrations in a well at or near an object to be surveyed, which mechanism is such that the frequency of the vibrations generated is determined by the angular position of the part being surveyed. By the present invention a simple, practical mechanism is provided to be wholly contained in the well or at or near the object to be surveyed, making control lines, power connections or other such elements unnecessary.

Another object of the present invention is to provide a mechanism of the general character hereinabove referred to which is operable repeatedly without being withdrawn from the well. With the mechanism of the present invention numerous readings or surveys can be made of an object in a well at different intervals of time, all without the necessity of moving parts or equipment of any kind into and out of the well.

Another object of the invention is to provide a mechanism such as has been referred to which is under full control of the operator at the surface or top of the well, so that he can make a survey or ascertain the position of an object in the well whenever desired and without appreciable interruption of well operations such as drilling operations that may be in progress.

Another object of the invention is to provide a mechanism of the general character referred to applicable to a typical or standard well drilling string. Deep wells are commonly drilled by the rotary method and this involves the utilization of the drilling string which is a long string of drill pipe having a drilling tool at its lower end. The usual string of drill pipe is a heavy, sturdy unit of equipment that transmits substantial torque and conveys mud-laden fluid to the drill bit and which is subject to severe shocks and strains during the course of operation.

The mechanism of the present invention is such that it can be applied to or incorporated in a well drilling string and it is thus to be distinguished from delicate impractical instruments that are totally impractical or useless as applied to a drilling string while it is in operation.

Another object of the present invention is to provide a unit or mechanism applicable to a well drilling string to serve as a section or portion thereof, so that it transmits the torque necessarily communicated through a drilling string and also properly handles the circulating fluid that must be conducted through a drilling string.

Figures 2, 3:
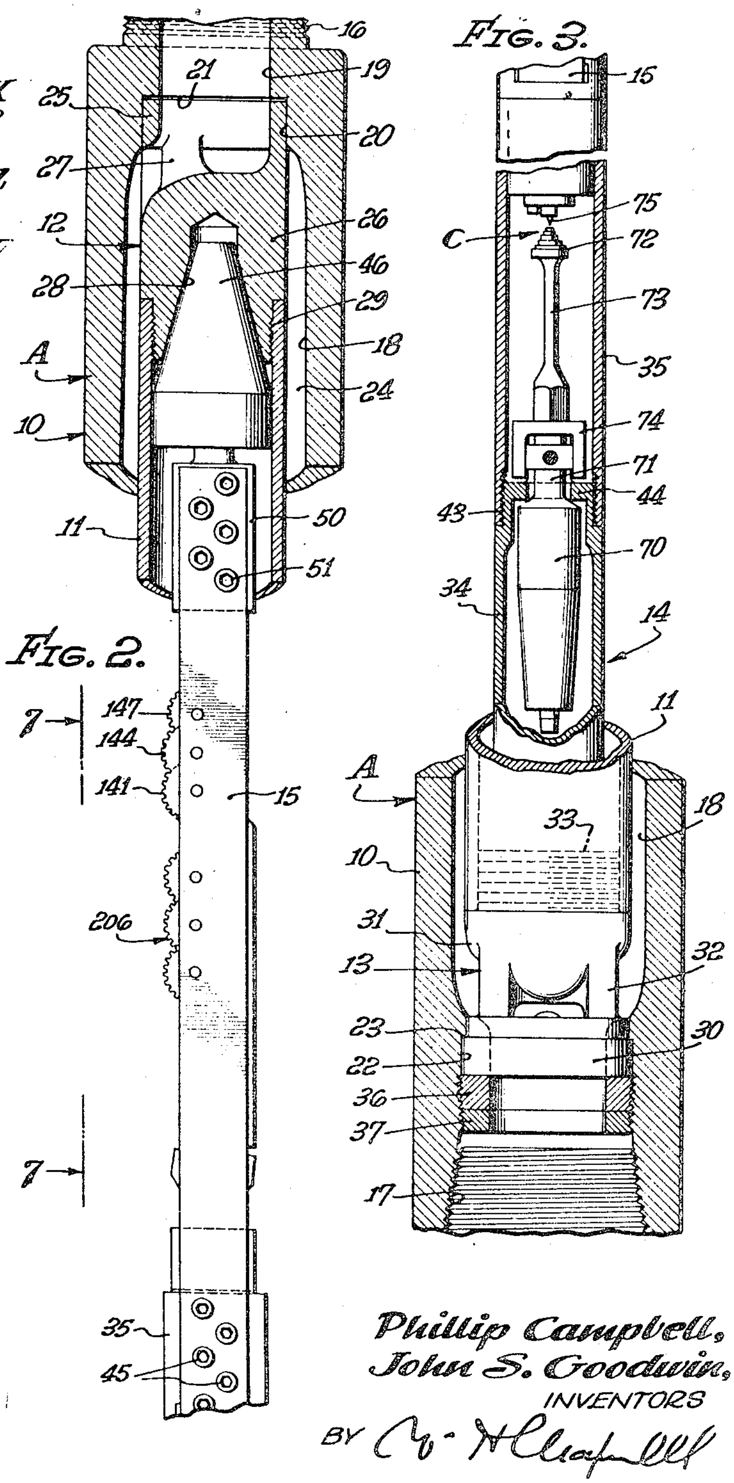
Figures 4, 5, 6:
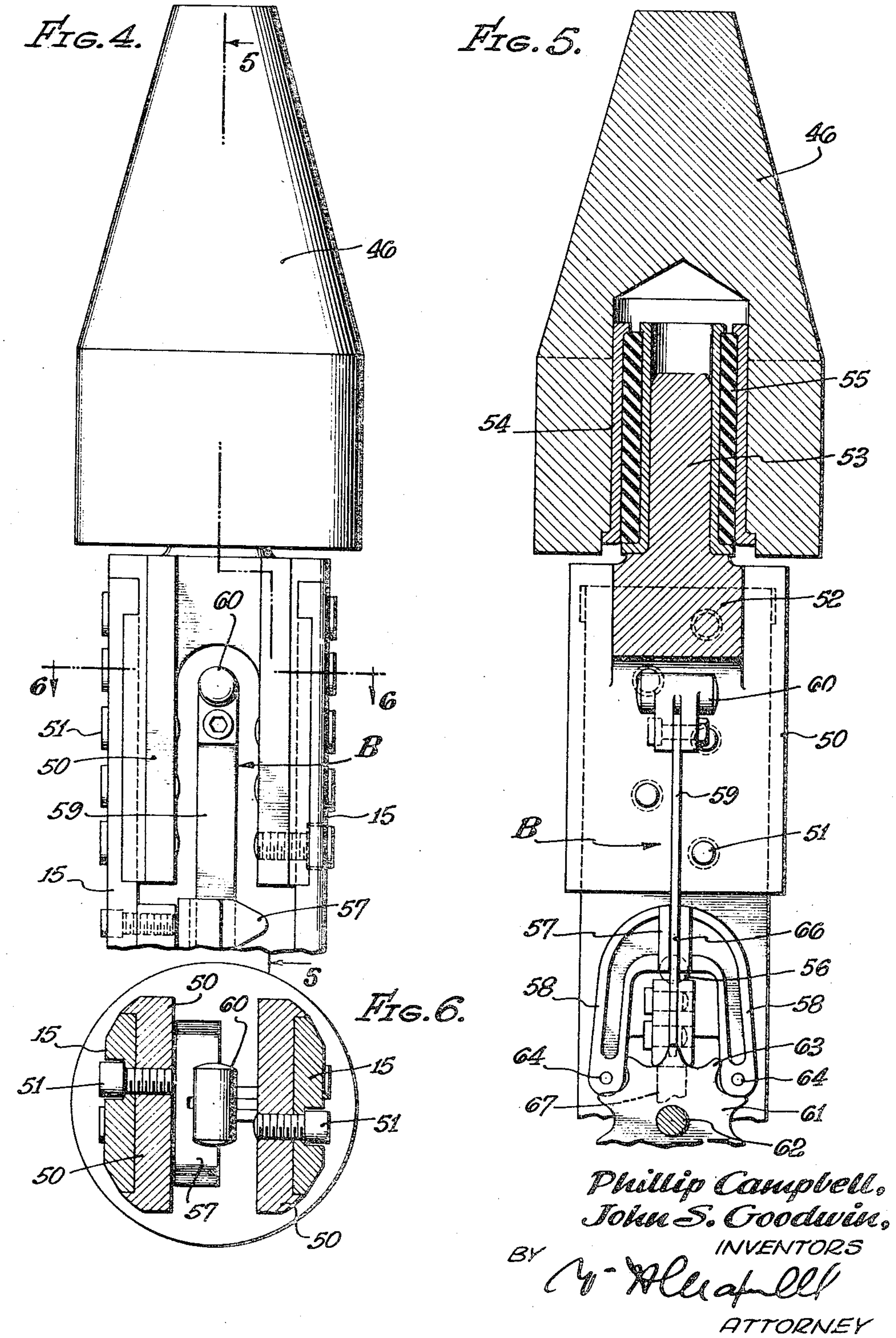
Figures 7, 8, 9, 10, 11:
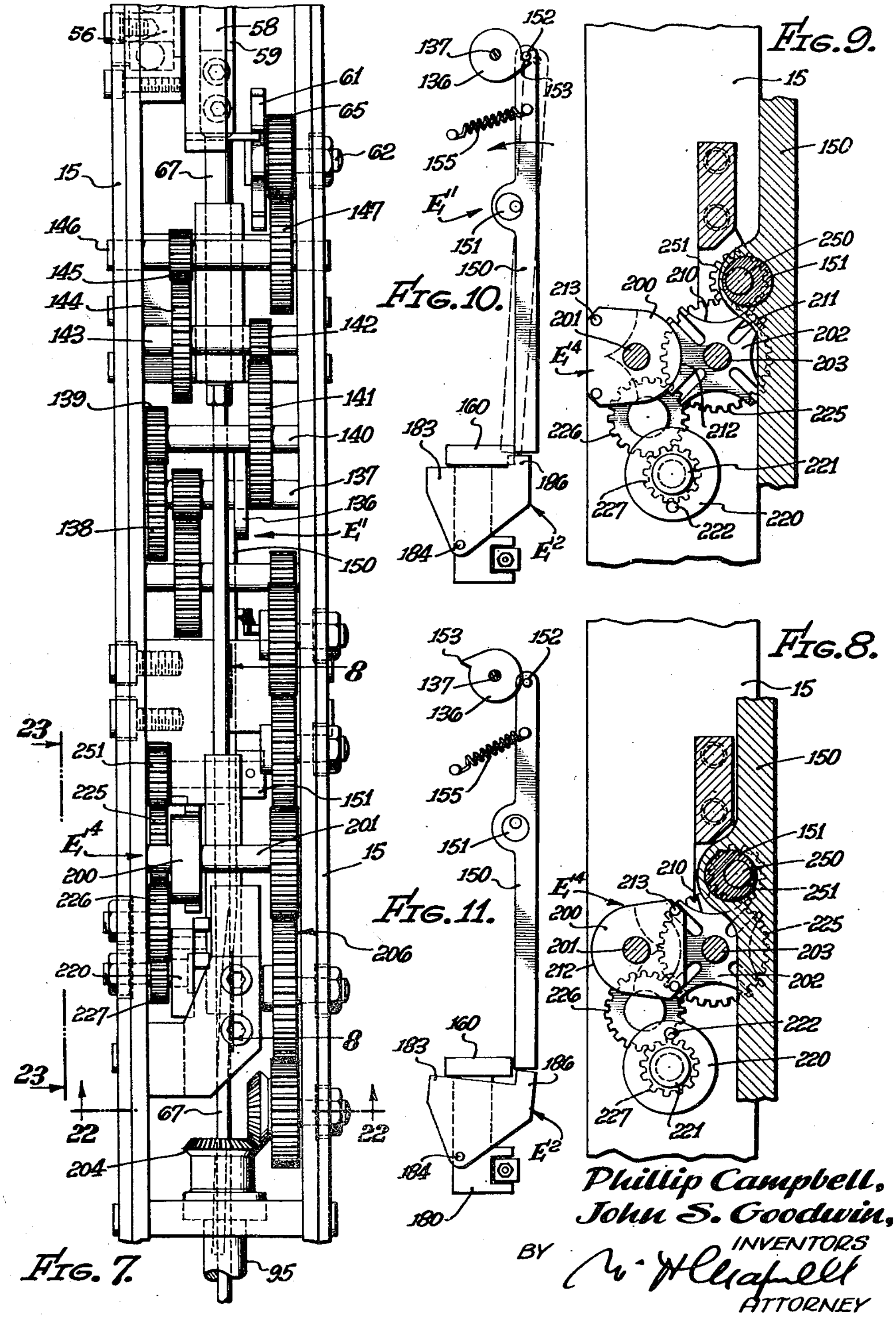
Figure 12:
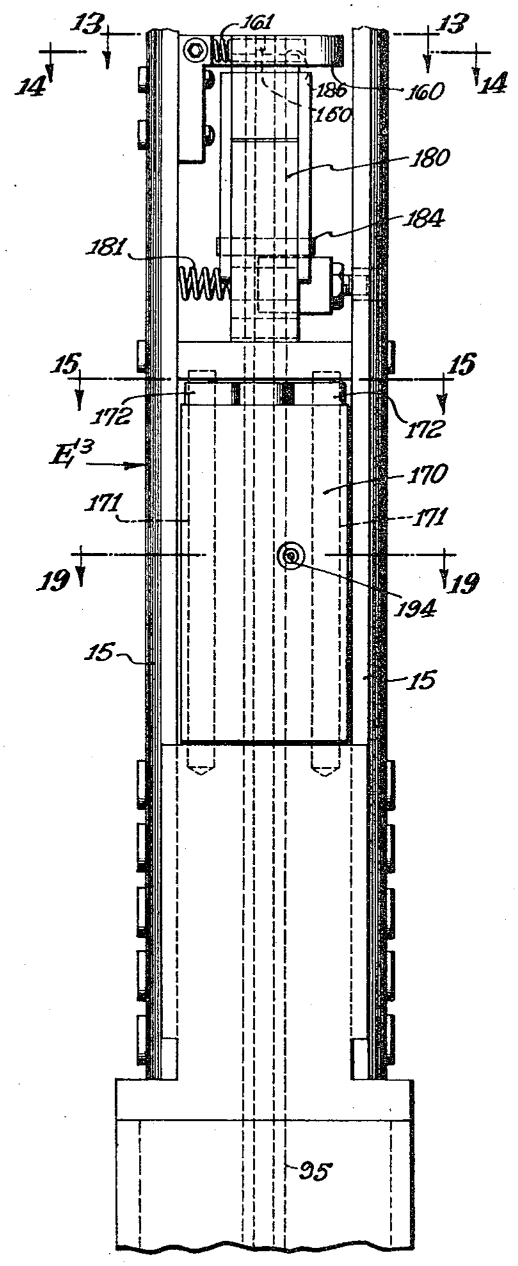
Figure 13:
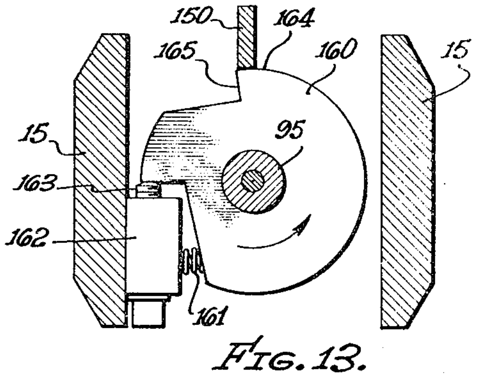
Figure 14:
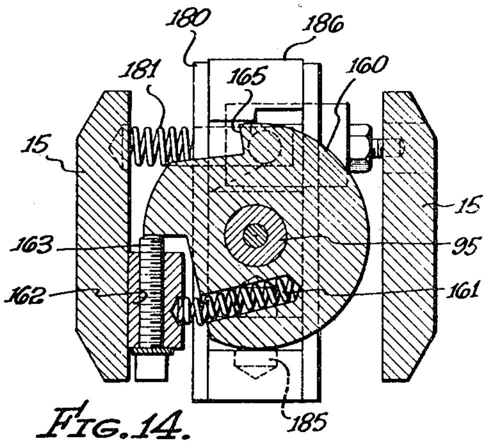
Figure 15:
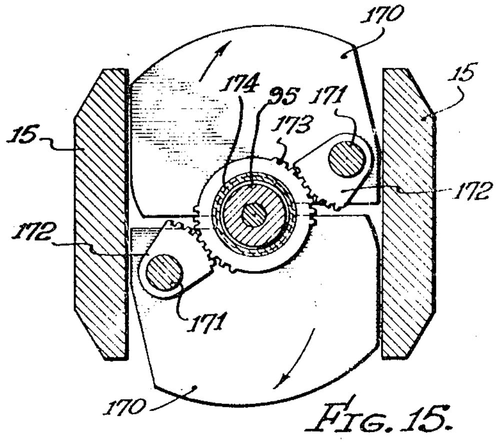
Figure 16:
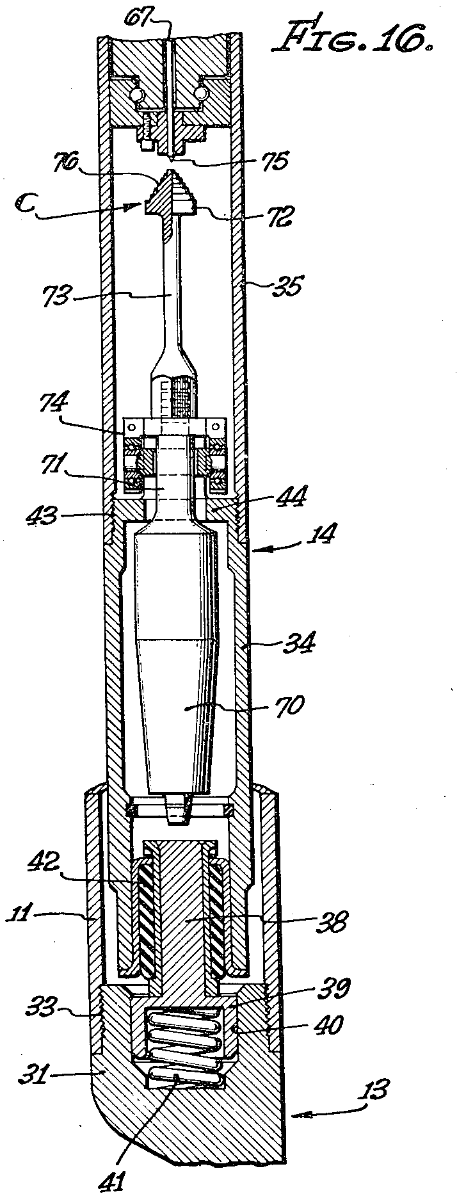
Figure 17:
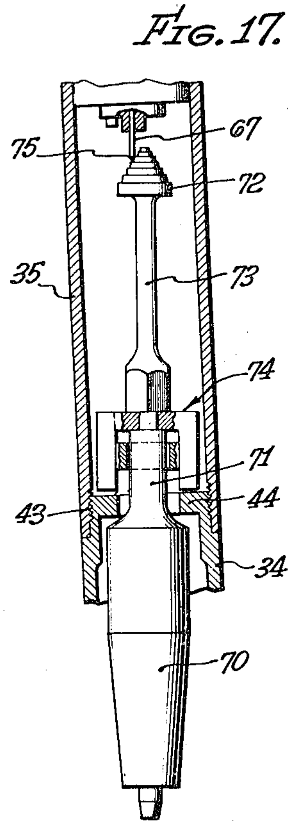
Figure 18:
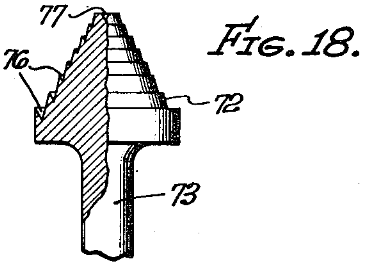
Figure 19:
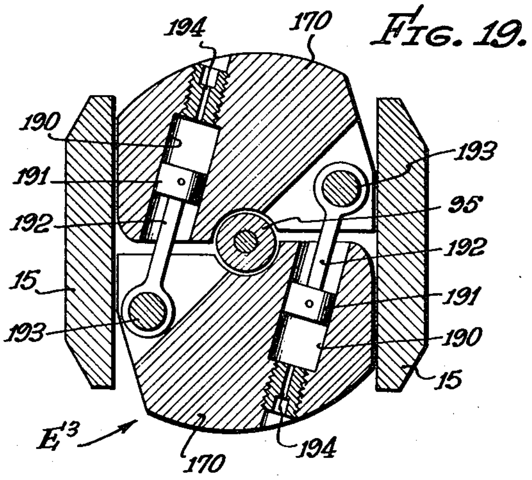
Figure 22:
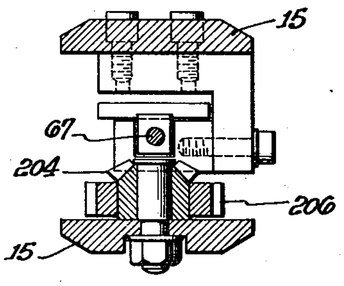
Figures 20, 21:
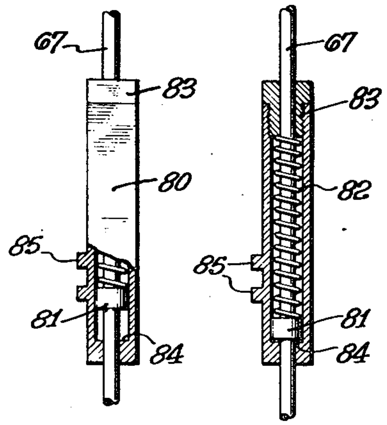
Figure 23:
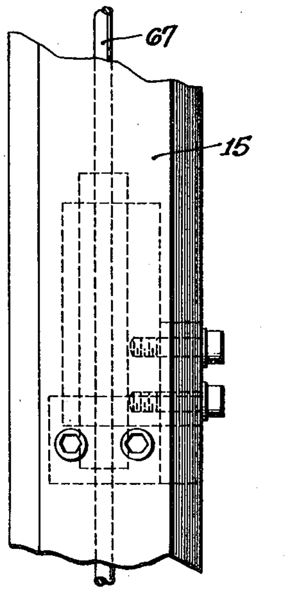
Figure 24:
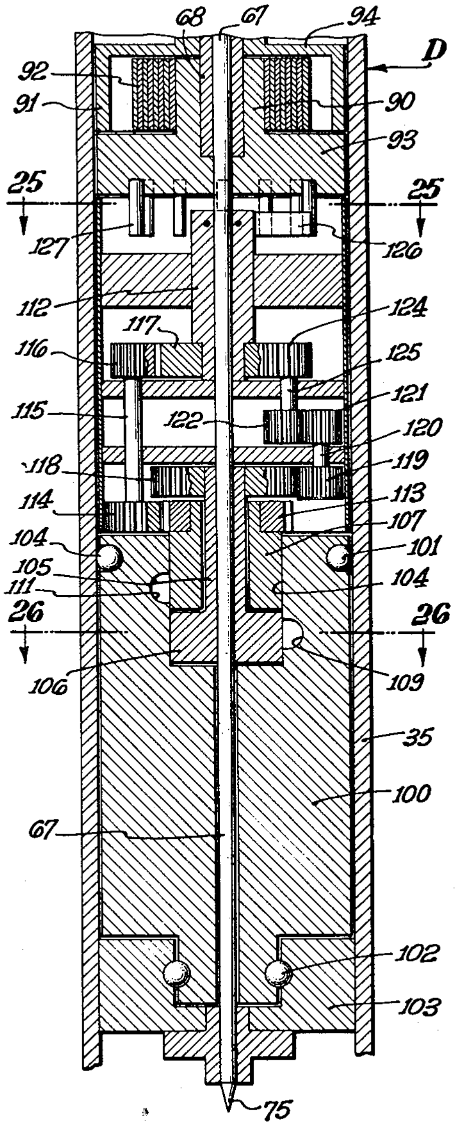
Figure 25:
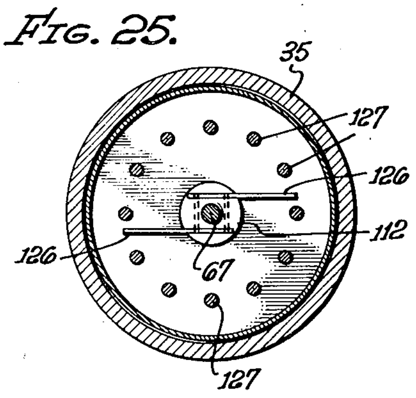
Figure 26:
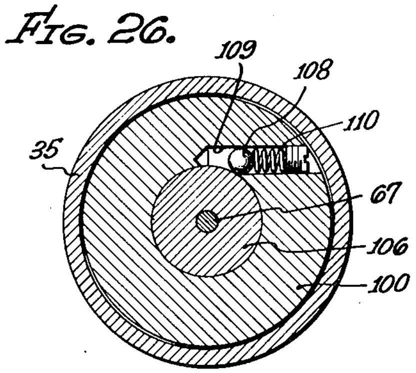
Figure 27:
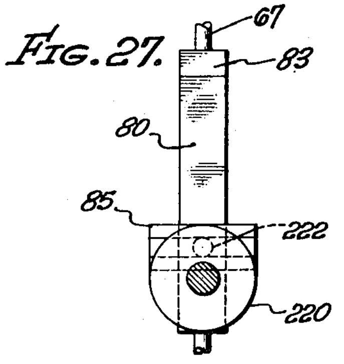
Figure 29:
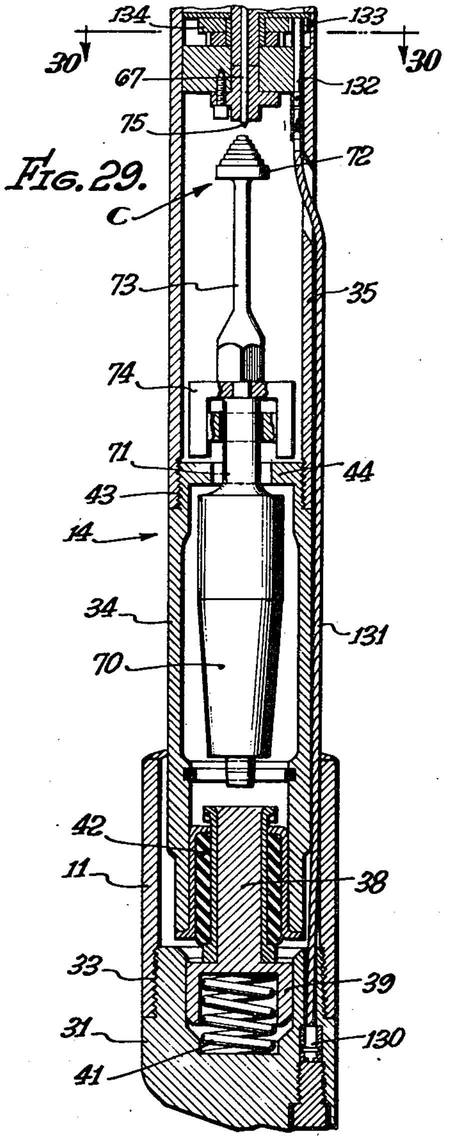
Figure 28:
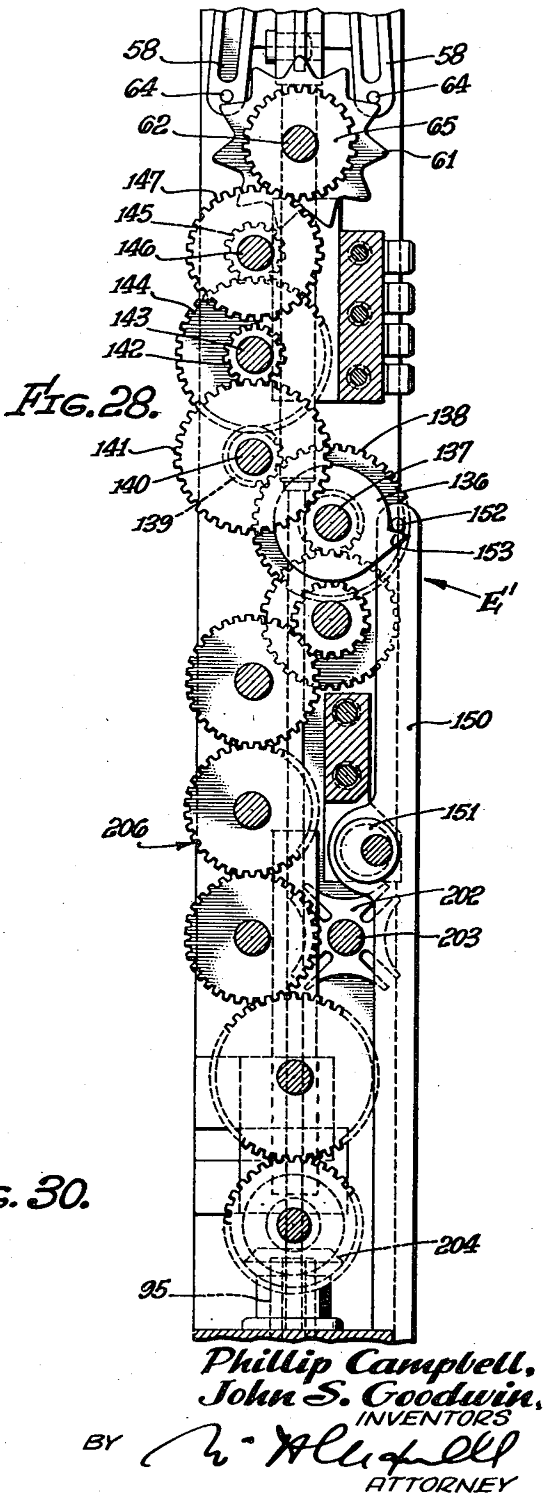
Figure 30:
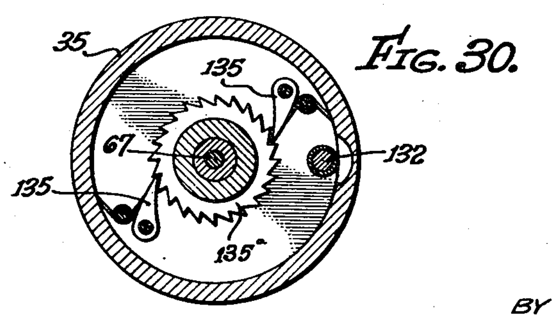

The various objects and features of our invention will be fully understood from the following detailed description of typical preferred forms and applications thereof throughout which description reference is made to the accompanying drawings, in which:

Fig. 1 is a somewhat diagrammatic or schematic view illustrating a well showing the present invention applied thereto. Fig. 2 is an enlarged view of the upper end portion of the mechanism provided for insertion in a drilling string, or the like, at or near the bit or other object to be surveyed, showing the outer portions or elements of the mechanism in section and broken away to leave the innermost parts visible. Fig. 3 is a view similar to Fig. 2 of the lower end portion of the mechanism. Fig. 4 is an enlarged view of the structure mounted in the upper end portion of the housing provided by the invention showing the parts that insert in the housing separate therefrom. Fig. 5 is a sectional view of the structure shown in Fig. 4 being a view taken as indicated by line 5—5 on Fig. 4. Fig. 6 is a detailed transverse sectional view taken as indicated by line 6—6 on Fig. 4. Fig. 7 is an enlarged view taken substantially as indicated by line 7—7 on Fig. 2, being a view showing the parts that occur at the center of the mechanism within the housing thereof. Fig. 8 is a view taken substantially as indicated by line 8—8 on Fig. 7 showing the parts in the normal or unactuated position. Fig. 9 is a view similar to Fig. 8 showing the parts in a partially operated or half-way position. Fig. 10 is a view of certain of the elements of the mechanism shown apart or without reference to other elements in order to facilitate illustration and showing the main stop mechanism engaged. Fig. 11 is a view similar to Fig. 10 showing the parts in a partially actuated position. Fig. 12 is a view similar to Fig. 7 showing a portion of the mechanism that occurs below the structure shown in Fig. 7. Fig. 13 is an enlarged detailed sectional view taken as indicated by line 13—13 on Fig. 12. Fig. 14 is an enlarged detailed sectional view taken as indicated by line 14—14 on Fig. 12. Fig. 15 is an enlarged detailed sectional view taken as indicated by line 15—15 on Fig. 12. Fig. 16 is an enlarged detailed view of a part of the mechanism shown in Fig. 3, certain of the parts being shown in section and others broken away. Fig. 17 is a view of a part of the mechanism shown in Fig. 16 illustrating the parts in another position. Fig. 18 is an enlarged detailed view of one of the elements shown in Figs. 16 and 17 with a portion of that element broken away to show in section. Fig. 19 is an enlarged transverse sectional view taken as indicated by line 19—19 on Fig. 12. Fig. 20 is an enlarged view of a part of the mechanism with a portion thereof broken away to show in section and showing the parts in one position. Fig. 21 is a view similar to Fig. 20 showing the parts in another position and the outermost part entirely in section. Fig. 22 is a transverse sectional view taken as indicated by line 22—22 on Fig. 7. Fig. 23 is a view taken as indicated by line 23—23 on Fig. 7. Fig. 24 is an enlarged detailed sectional view of a portion of the mechanism being a part of the power means. Fig. 25 is a transverse sectional view taken as indicated by line 25—25 on Fig. 24. Fig. 26 is a transverse sectional view taken as indicated by line 26—26 on Fig. 24. Fig. 27 is an enlarged view of the connection between the timer and the rod of the vibrator control. Fig. 28 is a side view of a part of the mechanism. Fig. 29 is a view similar to Fig. 16 showing a modified form of construction, and Fig. 30 is an enlarged sectional view taken as indicated by line 30—30 on Fig. 29.

The present invention provides or contemplates, broadly, the surveying of an object in a well, and insofar as numerous phases of the invention are concerned that object can be any one of a number of different elements of well equipment useful either in drilling or in production. Further, the invention contemplates making whatever survey is necessary to give the desired information and this, in some instances, may involve giving information concerning more than one factor. To facilitate an understanding of the invention it is here being disclosed in a form applicable to well drilling equipment and in a form operable to give a single reading, that is to survey a single object as to its variation from the vertical. More specifically the invention is disclosed as applied to a typical rotary drilling outfit and in this connection it is confined to the drill string so that the object or element being surveyed is the bit or lower end portion of the drill string so that the operator can determine, whenever desired, the amount that the drill string varies from vertical. The invention is particularly practical as applied to a situation such as has been mentioned. However, it is to be understood as by no means limited or restricted to such a use or application as there are many phases or aspects of it which are applicable, broadly, to surveying units or apparatus.

In the diagrammatic view, Fig. 1, we illustrate a typical derrick or rotary drilling outfit X located over a well bore W shown with a casing in its upper portion. A drilling string S extends into the well W from the derrick X and is provided at its lower end with a tool T. The tool may, for example, be an ordinary drilling bit being operated by the string S to advance the bore W. The unit or mechanism provided by the present invention is shown at Y adjacent the tool T, in fact connected in the string S between the tool T and the lower end of the string S.

The invention contemplates use of a receiver Z located at or near the drilling outfit or derrick X operable to receive vibrations set up by the mechanism Y and to amplify them so that they are either perceptible audibly or visually, or are recordable, or both, making them useful to the operator so that he is advised as to the angular position of the tool T. Broadly, the invention contemplates that the mechanism Y be such as to set up or generate vibrations the frequency of which is determined by the angular position of the mechanism or the tool T, which is in conjunction therewith. The invention contemplates a sturdy mechanical mechanism effective to set up strong or distinct mechanical vibrations or signals, preferably of a low frequency.

Where the mechanism Y of the present invention is incorporated in a drilling string S so that it is, in effect, a part thereof, as shown in the diagram, Fig. 1, it is preferred that the receiver Z be connected with or to the string S by a suitable line L when it is desired to take a reading. The receiver may be permanently connected to a casing head, swivel or other like part. It is to be understood that the receiver Z can, in practice, be any suitable amplifying device. In practice we employ an ordinary vacuum tube amplifying mechanism tuned to respond to the character of the vibrations or signals set up in the mechanism Y and having sufficient amplification to give a signal perceptible to the operator either audibly or by way of an indicating dial which may have incorporated recording means. So far as the present invention is concerned the receiver Z is only broadly a part thereof since any suitable amplifying mechanism can be used in this connection. The subject of the present application is more specifically concerned with the equipment that goes into the well, that is with the mechanism Y which acts to set up or establish the desired vibrations or signals and which, in its preferred form, is under control of the drill pipe or drill string S as will be hereinafter described.

The mechanism Y embodying the present invention may, in practice, be varied considerably, depending upon the situation in which it is to be used. However, since the mechanism is particularly applicable to use in or in connection with a drilling string S or the like, it will be described in a form and as applied to a drilling string S. The mechanism Y being provided as a part or element of a drilling string S must not only serve as an instrument to set up vibrations or signals in response to the angulation of some part or element, but it must also act to communicate torsional, as well as compressive and tensile, strains, and it must have a substantial capacity for carrying circulating fluid, ordinarily mud laden fluid, necessary in carrying out the usual rotary method of drilling.

The mechanism Y in the form here disclosed involves, generally, a body A which is the main or primary element handling mechanical strains, both torsional and tensile strains, a vibrator B which is a mechanical mechanism operable to generate vibrations or signals of such intensity that they are communicated to equipment at the top of the well, for instance, at or in the rig X. Where the mechanism Y which incorporates the vibrator B is included as a part of the well drilling string S it is advantageous that the signals or vibrations be taken from the string S at the rig X. However, it is to be understood that such vibrations or signals may be communicated by means other than the string S, for example, through the well fluid or a casing present in the well, or other like parts or combinations thereof.

The mechanism further includes control means C for the vibrator which control means is adjustable or responsive to the element to be surveyed. It is preferred to incorporate as an element of the mechanism Y a power means D so that the mechanism or unit in the well is a fully self-contained unit independent of any outside sources of power such as electrical cables, jerk lines, etc. The control incorporated in the mechanism Y involves, generally, a main stop mechanism E', a centrifugal control $E^2$ for the stop mechanism E', a time delay means $E^3$ for the centrifugal control and a sequence timer $E^4$ governing each action or operation of the mechanism.

The body A of the mechanism Y may be described, generally, as an elongate tubular structure to be connected in a string S of drill pipe or the like, to form a part thereof, or it may be arranged as shown in Fig. 1 as a connection between a tool T and the lower end of a string of drill pipe, or the like. In function the body A serves, generally, to withstand a substantial compressive strain and also to transmit torque such as may be incidental to the operation of a tool T from a string of drill pipe S, or the like. Further, the body A serves as a conduit for circulation fluid, usually mud-laden fluid, and it further serves as a frame or mounting or carrier for the various other parts of the mechanism as will be hereinafter described. In the preferred form of the invention the body A includes a main or outer shell 10 which extends the length of the mechanism Y, a housing 11 which is a tubular element spaced within the shell 10, a top mounting 12 for the upper end of the housing, a bottom mounting 13 for the lower end of the housing, a case 14 mounted in the lower portion of the housing 11, and side plates 15 mounted in the upper portion of the housing 11 above the case 14.

The main shell 10 is preferably a single, continuous tubular element and is the outermost part of the mechanism. The shell 10 is a heavy walled member designed to withstand substantial strain in tension, compression and torsionally. Where the mechanism is to be connected as illustrated in Fig. 1, the shell may be provided at its ends with standard coupling parts, for instance it may have a tapered threaded pin projection 16 at its upper end and a tapered threaded socket 17 in its lower end.

The opening 18 provided through the shell 10 may be a straight continuous round opening except at the ends of the shell where the structure is reduced somewhat in diameter. At the upper end portion the shell 10 is reduced to have a central fluid receiving opening 19 continuing through the pin 16 and considerably smaller in diameter than the opening 18. In the reduced upper end portion of the shell 10 there is a bore 20 smaller in diameter than the opening 18 and larger than the opening 19 forming a downwardly facing shoulder 21 in the upper end of the body. In the lower end portion of the shell 10 there is a bore 22 extending upwardly from the threaded socket 17 terminating at a downwardly facing shoulder 23. The lower end portion of the bore 22 is threaded for the purpose hereinafter described.

The housing 11 is an elongate tubular part and may, in practice, be a single continuous tube or shell the outside diameter of which is considerably smaller than the opening 18 through the main shell 10, leaving a substantial fluid passage 24 between the housing and the main shell. The housing 11 is provided, primarily, as a casing or carrier for the various parts of the mechanism that require protection, and although it is made sufficiently heavy to be substantially rigid and of considerable strength it is not depended upon to carry drilling strains. The top mounting 12 for the housing 11 may vary considerably in form and design, its primary purpose being to support the upper end of the housing 11 concentrically in the upper end of the main shell 10 and conduct circulating fluid from the opening 19 to the passage 24. In the construction illustrated the means 12 is a fitting involving a ring 25 that fits into the opening 20 in the upper end portion of the shell 10, a socket member 26, and spaced legs 27 supporting the socket member 26 from the ring 25. The socket member 26 has a central downwardly opening tapered socket 28 and its lower end is externally threaded at 29 to thread into the upper end of the housing 11.

The legs 27 act as webs or ribs connecting the ring 25 and the socket part 26 and are preferably integrally joined with these parts and are spaced apart so that there is an efficient fluid connection between the opening 19 that communicates with the string S and the passage 24 between the main shell 10 and the housing 11.

The bottom mounting 13 includes a ring 30 which fits the opening 22 in the lower end portion of the main shell 10 to bear upwardly against the shoulder 23. A pin section 31 is supported above the ring 30 on spaced legs 32. The pin section 31 has an externally threaded upwardly projecting part 33 which screw threads into the lower end of the housing 11 as clearly shown in Fig. 16 of the drawings. The legs 32 may be integrally joined with the ring 30 and pin section 31 to form efficient fluid passages connecting the passage 24 with the housing in the socket 17.

It is to be observed that the ring 30 is somewhat larger in diameter than the housing 11 and the ring 25 of the upper mounting making it possible for the housing with its top and bottom mountings assembled with it to be slid upwardly into the main shell 10 until the ring 25 is in the bore 20 and the ring 30 seats against the shoulder 23. A jam nut 36 is threaded in the lower portion of opening 22 to hold the ring 30 tight against the shoulder 23 and a lock nut 37 or other suitable means may be provided for making the jam nut secure. It is to be observed (see Fig. 2) that the ring 25 clears the shoulder 21 when the parts are in position, thus allowing for some relative longitudinal movement between the ring 25 and the upper end of the main shell 10, and possibly some movement due to torque without straining or disturbing the housing 11 which carries the working mechanism.

The body or frame structure that we have provided includes, primarily, the casing 14 and side plates 15 mounted within the housing 11 and these parts carry the active or working parts of the mechanism. The case 14 is preferably a tubular case located in the lower portion of the housing 11 and involves a lower section 34 and an upper section 35. The case 14 serves, primarily, as a carrier or housing for certain elements of the control, mainly parts of the control and power means for the vibrator.

In the form of construction shown in the drawings and particularly in Fig. 16 of the drawings, the lower end of the lower section 34 of the case is mounted from the pin section 31 through a central vertical pin 38. The pin 38 has an enlarged head 39 slidably carried in a central bore 40 in the section 31 and a compression spring 41 acts between the bottom of the bore 40 and the head 39 to urge the pin 38 upwardly. The lower end of the case section 34 surrounds the pin 38 and is supported thereon by suitable mounting means 42.

The upper and lower sections of the case are joined, for instance, threaded together, at 43 and an inwardly projecting flange 44 is provided in the upper end of the lower section 34. The upper section of the case projects a substantial distance above the lower section and the lower end portions of the side plates 15 are connected to the upper end portion of the upper section 35 of the case as by screws 45.

The side plates 15 which may be flat, elongate frame members substantially alike project upwardly in spaced relation from the upper end of the upper case section to the upper end portion of the housing 11 where they are mounted in the socket section 26 by a center pin 46. The center pin 46 is designed to fit snugly in the tapered socket 28 and has depending flanges 50 to which the upper end portions of the side plates are connected. In the arrangement shown the flanges 50 are spaced a substantial distance apart and the side plates are secured to the outer sides of the flanges 50 as by screws 51. In the particular construction shown the depending flanges 50, which carry the side plates, are not directly secured or attached to the pin 46 but are joined by a web 52 which has a central upwardly projecting pin 53 supported in a central socket 54 in the lower end of the pin 46 through a bushing 55 of rubber, or the like. Through this construction the upper ends of the side plates are rigidly spaced and are effectively secured together through the flanges 50 and the web 52 but the upper end portion of the assembly formed by the side plates is mounted in the pin 46 through a cushion.

The vibrator B is located in the upper end portion of the housing 11 and is supported or carried by the upper end portions of the side plates 15 which are held in the upper end portion of the housing by the centering plug 46 held in the mounting 12 threaded to the upper end of the housing. The vibrator in its preferred form is a mechanical vibrator or signalling device operable to set up vibrations or to strike in a manner so that vibrations occur that can be picked up by the receiver Z. In general the vibrator is driven by the power means D and it is essentially an oscillating or pendulum device combined with an escapement mechanism.

In the preferred form of vibrator B illustrated, particularly in Figs. 4, 5 and 6 of the drawings, there is a pivotal support or shaft 56 supported from the side plates to have a fixed pivotal axis and so that it is free to have an oscillatory motion or movement. A yoke is carried by the shaft 56 and has a central body 57 and spaced projecting arms 58. In the particular arrangement illustrated the arms project downwardly from the point of pivotal mounting and diverge somewhat. A lever arm 59 is carried by the body 57 to project therefrom and is preferably a flexible or resilient member. In practice the arm 59 is in the form of a leaf spring and in the arrangement illustrated it projects upwardly from the body 57. A mass or weight 60 is fixed on the outer or upper end of the arm 59 and the arrangement of parts is such that the upper end portion of the arm and the weight carried thereby is clear or free to oscillate or vibrate a substantial amount without interference.

An escapement wheel or sprocket 61 is carried by a shaft 62 having a fixed pivotal axis spaced from the shaft 56, preferably below the shaft 56. The sprocket 61 has a plurality of equally spaced like teeth 63 and striker pins 64 are carried by the outer end portions of the yoke arms 58 to cooperate with the teeth 63. The sprocket 61 with its teeth 63 and the yoke with its spaced striker pins 64 cooperate or act as an escapement movement so that as force is applied to the sprocket 61 tending to rotate it the striker pins cooperate with the teeth to move in and out alternately striking at the root between adjacent teeth.

The escapement movement that we have provided is designed not to create a gentle tick as does such a movement in a clock, but rather so that there is a definite and violent striking of the pins 64 between the teeth in a manner to set up the vibrations or signals to be picked up at the top of the well. It is possible, in carrying out our invention to utilize the mass 60 on the arm 59 as a hammer to strike opposed anvils in order to set up the vibrations or signals. However, it appears more advantageous to allow the mass 60 to move freely and to create the desired strike between the strikers 64 and the roots of the teeth. The drive of the sprocket wheel 61 may be effected in any desired manner. In the arrangement illustrated the sprocket 61 is fixed on the shaft 62 and is driven from the power means D, as will be hereinafter described.

The control means C for the vibrator B acts broadly as an adjusting means or adjustment control for the vibrator in that it is operable to vary the action of the vibrator so that it strikes at varying rates or frequencies.

The control means C involves, generally, adjustability of the arm 59 relative to the body 57 so that it strikes at varying rates or frequencies.

The control means C involves, generally, adjustability of the arm 59 relative to the body 57 so that the effective length of the arm 59 is governed by a means such as a plumb-bob or the like. In the form of the invention illustrated the arm 59 is slidably carried in a guideway 66 provided in the body 57 so that the arm can be moved vertically relative to the body and thus vary its effective length as a pendulum or vibrator. A rod 67 depends from the arm 59 and extends centrally downward through the mechanism, that is, between the plates 15 and into the upper section 35 of the case 14. In the particular arrangement illustrated a tube 68 is provided to house the rod as it extends downwardly to the case and through the power means located in the upper end portion of the case.

In the particular form of the invention being described it is desired to ascertain the deviation or variation of the longitudinal axis of the mechanism Y from the vertical or, in other words, to determine the angularity of the tool T on the lower end of the mechanism Y relative to the vertical. To make such a determination it is advantageous to employ a plumb-bob and in the mechanism illustrated we show a plumb-bob involving, generally, a mass or weight 70 supported from an upwardly projecting stem 71 supported through a universal joint, and a head 72 on the upper end of an extension 73 of the stem 71.

In the particular arrangement illustrated the mass or base 70 of the pendulum is carried in the lower section 34 of the case 14 and the stem 71 projects upwardly into the upper section of the case. A suitable universal joint mechanism 74 is mounted on the flange 44 at the top of the lower section 34 of the case and supports the base of the pendulum so that it is free to maintain a central or perpendicular position regardless of the angular position to which the case may be moved around it. The extension 73 of the plumb-bob stem projects upwardly in the upper section 35 of the case and the head 72 provided on the upper end of the stem extension is formed to cooperate with a tip 75 on the lower end of the rod 67. In practice the structure provided for cooperatively relating the rod which depends from the arm 59 with the head on the plumb-bob may vary widely. In the particular case illustrated the head 72 is an upwardly faced conical part with a series of small or fine angular channels 76 around it occupying its outer or conical surface from a point adjacent its apex to its base. The tip 75 provided on the rod 67 is preferably a pointed part designed to engage into and be held by one of the channels 76. In practice a central depression or socket 77 may be provided at the apex of the head as shown in Fig. 18.

With the arrangement just described and from Figures 16 and 17 of the drawings it will be observed that if the casing carrying the plumb-bob is perpendicular, as it will be when the entire mechanism is vertical or perpendicular in that the casing is centrally located and extends longitudinally of the mechanism, the rod 67 which is centrally located upon being lowered will cause the tip 75 to engage in the socket 77 at the apex of the plumb-bob head. With this relationship of parts the arm 59 will be in a predetermined position relative to the body 57. If the case is tipped or deflected from a perpendicular position then if the rod 67 is moved down the tip 75 will engage in one of the channels 76, the particular channel engaged being determined by the degree of inclination of the case. It follows that for any particular degree of inclination of the case the tip 75 will be caught in a certain channel in the head of the plumb-bob and it will be apparent that as the degree of inclination increases the tip engages channels closer to the base of the plumb-bob head and consequently the rod 67 is allowed to move lower and consequently the effective length of the arm 59 becomes shorter. In the extreme position the tip 75 engages the lowermost chanel 76 in which case the arm 59 is in its lowermost position to have the shortest effective length. It is to be understood, of course, that the length of the arm 59 above the head 57 governs the rate at which the escapement movement will operate and, consequently, as the arm 59 is adjusted through the mechanism just described the rate of vibration or of signalling is varied.

The control means C further includes means for operating the rod to move the tip 75 into engagement with the head 72 or, at least, it includes an element that will be termed an operator for the rod.

In the form of the invention illustrated the operator for the rod includes a sleeve 80 slidably mounted on the rod 67. A shoulder 81 is provided on the rod 67 within the sleeve 80 and a spring 82 is carried in the sleeve between the top of the shoulder 81 and a plug 83 in the upper end of the sleeve. A shoulder 84 at the lower end of the sleeve normally engages the under side of the shoulder 81 so that the sleeve 80 is normally yieldingly held in an up position, as shown in Fig. 21. A pair of spaced lugs 85 are provided on the exterior of the sleeve and are engaged so that the sleeve can be moved downwardly through the mechanism hereinafter described, With the particular mechanism hereinafter described the sleeve 80 is moved down a predetermined or maximum amount for each operation and the sleeve acts through the spring 82 to move the rod 67 down, but when the tip of the rod engages the head of the pendulum further downward movement of the rod stops and the sleeve 80 merely overtravels or moves down compressing the spring 82.

The power means D may, in accordance with the broader principles of the invention, be any suitable driving device or prime mover. However, where the mechanism is to be employed in a drill string or the like, and in fact, in most situations, it is preferred that the power means be self-contained in the mechanism to eliminate fluid conduits, electrical wires, or other elements that are complicated, cumbersome, or to some degree impractical. In the particular mechanism illustrated we provide an inertia motor and we locate it in the upper end portion of the upper section 35 of the case 14.

In the form of the invention shown in Figs. 1 to 27, inclusive, the inertia motor involves a plurality of spring units each of which includes a hub 90 rotatably mounted on the tube 68, a shell 91 spaced around the hub and operating with suitable clearance in the casing section. A coiled or wrapped leaf spring 92 in the nature of a heavy clock spring has its inner end fixed to the hub 90 and its outer end fixed to the sleeve 91. A flange projects radially from the lower end of each hub and may be termed the driver for the hub. The flange 93 of the lowermost hub of a series of spring units is engaged and driven by a winding mechanism that will be described later. The flanges 94 of the units superimposed upon the lowermost unit project outwardly and join the upper ends of the lower adjoining sleeves 91. Through this arrangement, by rotating the flange 93 of the lowermost spring unit the several springs 92 are wound and the springs act in series to drive or rotate an extension 95 of the hub of the uppermost spring unit which extension 95 forms the drive shaft from the power means.

In practice various means may be provided for winding the spring units to store energy for driving the drive shaft. In the arrangement illustrated we provide a mass or inertia element 100 in the form of a weight in the casing section 35 below the series of spring units. This weight floats or is totally free of the casing, being supported for rotation by anti-friction bearing means. In the case illustrated a series of ball bearings 101 supports the upper end of the weight while a suitable ball bearing construction 102 supports the lower end of the weight in a bearing block 103 fixed in the casing. The weight or inertia element thus mounted in the casing will not move or rotate with the casing due to inertia and, consequently, as the casing rotates during the normal course of drilling operations, it will rotate at various speeds and will from time to time start and stop, and there will be numerous periods during which its speed of rotation varies, sometimes accelerating, other times decelerating. As a consequence of normal drilling operations there will be a more or less constant variation of movement or relative movement between the casing and the weight 100.

We utilize the relative rotary movements that occur between the casing 14 and the weight 100 to wind the spring motor or, in other words, to store energy for driving the shaft 95. In the particular form of the invention illustrated a central counterbore or socket 104 is provided in the upper end of the weight 100 and two concentric but independently operable ratchet shafts extend into the socket. An inner ratchet shaft 105 extends into the socket and at its inner or lower end has a head 106 rotatably fitted in the socket. The outer ratchet shaft 107 is rotatably carried on or surrounds the inner ratchet shaft and extends into the outer end portion of the socket. A ratchet drive means is provided between the head 106 and the weight 100 so that when the weight 100 moves in a clockwise direction relative to the casing 14 the inner shaft 105 will be turned in a clockwise direction relative to the casing, and consequently, to the various other parts supported therein, against rotation.

In practice the ratchet drive may vary as desired. In the particular case illustrated a wedge ball 108 is carried in a tangential guideway 109 provided in the weight and a spring 110 normally urges the ball so that it engages the outer surface of the head 106. When the weight turns in a clockwise direction relative to the casing ball 108 wedges between the head 106 and the weight, causing the head to be carried around with the weight, but when the weight turns in the opposite direction the ball is freed from the head 106 allowing the weight to turn freely relative to the head.

A similar but opposite drive means is provided between the weight 100 and the outer shaft 107. A guideway 111 is provided in the weight opposite the shaft 107 and a wedge ball is carried in the guideway 111 and is urged by a spring, but the parts are arranged and related so that the wedging effect between the weight and the shaft 107 occurs only when the weight moves in a counter-clockwise direction relative to the casing. With the mechanism just described it will be apparent that whenever there is relative rotation between the weight and as casing due to the inertia action above referred to, one or the other of the shafts 105 or 107 will be rotated, although they are rotated in opposite directions.

To utilize the rotation of the inner and outer shafts 105 and 107, respectively to wind the series of spring units we provide a gear drive from one shaft to a winding shaft 112 and a gear drive from the other shaft to the winding shaft 112 one of which gear drives involves a reversing gear. In the particular arrangement illustrated and shown in Fig. 24 a pinion 113 on the outer shaft 107 drives a gear 114 on a countershaft 115, an a pinion 116 on the countershaft 115 engages and drives a gear 117 on the winding shaft 112. The drive from the inner shaft involves a pinion 118 on the inner shaft 105 driving a gear 119 on a first countershaft 120, a pinion 121 on the first countershaft meshes with and drives a gear 122 on a second countershaft 123, and a pinion 124 on the second countershaft meshes with and drives the gear 117. The pinion 121 and gear 122 reverse the motion from shaft 105 so that the winding shaft 112 is always driven in one direction regardless of whether the drive is from the inner shaft 105 or the outer shaft 107.

In practice it is preferred to provide a safety or yielding drive between the winding shaft 112 and the series of spring units. In the particular arrangement illustrated we provide one of more spring arms 126 on the winding shaft 112 to extend between and cooperate with pins 127 projecting from the flange 93 of the lowermost spring unit. The pins 127 are arranged in an annular series and the arms 126 are related to the pins 127 so that when sufficient resistance develops due to the spring units being fully wound, the winding shaft can continue to rotate without failure of parts, since the spring arms will simply snap past the pins.

In the modified form of means for winding the spring units, as shown in Figs. 29 and 30 a winding stem 130 is provided at the lower end of the mechanism where it is accessible and a flexible drive shaft 131 extends from the stem of the lower end of the series of spring units where it operates a shaft 132 rotating a gear 133 which drives a ring 134. The ring 134 carries a ratchet wheel 135ᵃ which cooperates with an extension of the hub of the lowermost spring unit. With this arrangement it is necessary to initially wind the spring motor and from time to time it is necessary to wind the spring motor, whereas with the form of the mechanism first described the spring motor is wound as drilling proceeds and it is unnecessary to provide a manually operable means for this purpose.

The control that we have provided is responsive to movement, preferably rotation, of the mechanism or, in other words, to rotation of the drilling string S, and is thus a master control under control of the operator or driller so that by a given manipulation of the drilling string the mechanism can be set into operation so that the vibrator gives out a signal the frequency of which depends upon the angle at which the mechanism is disposed.

The master control has, for purpose of simplicity, been segregated into distinct parts termed the main stop mechanism E′, the centrifugal control for the stop $E^2$, the time delay means for the centrifugal control $E^3$, and the sequence timer $E^4$. These various parts or elements of the mechanism are best illustrated in Figs. 7 to 15, inclusive, and 19, and in the preferred arrangement power or motion from the motor drive shaft 95 is, in effect, communicated through the timer and the main stop mechanism, the timer being arranged adjacent the vibrator. The several elements just named, that is, elements $E^1$, $E^2$, $E^3$ and $E^4$, are somewhat interconnected and are nested together, forming a compact assembly of parts carried between the side plates 15 between the vibrator and power means. When the mechanism is in operation there is a direct power drive from the motor drive shaft 95 to the gear 65 driving the sprocket wheel 61 of the vibrator and when the main stop mechanism is engaged or in operation this drive or action is stopped so that no motion occurs in the mechanism due to the force exerted by the springs on the motor drive shaft 95.

The main stop $E^1$ involves, generally, a cam disc 136 fixed on a shaft 137 carried between the side plates 15. The shaft 137 is geared to and drives the gear 65 through a suitable gear train designed to give the desired gear ratio between the shaft 137 and the sprocket shaft 62. In the particular arrangement illustrated a gear 138 on shaft 137 drives a gear 139 on a shaft 140, a gear 141 on shaft 140 drives a gear 142 on a shaft 143, a gear 144 on shaft 143 drives a gear 145 on a shaft 146, and a gear 147 on shaft 146 meshes with and drives the gear 65 on the sprocket shaft 62.

In addition to the cam disc 136 on the shaft 137 the stop means $E^1$ involves a lever 150 pivotally supported intermediate its ends on a bearing block 151. A stop pin 152 on the upper arm of the lever 150 cooperates with the shoulder 153 on the cam disc so that when the said upper arm is swung in as indicated by the arrow in Fig. 10 the pin engages the shoulder and stops rotation of the shaft 137 in the direction in which the power means tends to drive it. A spring 155 is coupled with the lever to normally yieldingly urge the arm into a position where the pin 152 cooperates with the shoulder 153. The lower arm of the lever depends a substantial distance below the bearing block 151 and its lower end portion engages and cooperates with the centrifugal control $E^2$ as will be hereinafter described.

The centrifugal control $E^2$ is operable to release the main stop $E^1$ upon the drill string and, consequently, the entire mechanism, being manipulated or rotated in a predetermined manner.

The centrifugal control includes a main control disc 160 rotatably supported on the central tube 95. The control disc 160 is normally urged around in a counter-clockwise direction as indicated by the arrow in Fig. 13 through the action of a compression spring 161 which acts between the disc and an abutment 162. A stop 163 limits movement of the disc 160 in the direction indicated by the arrow in Fig. 13 and this stop is preferably adjustable, for instance, it may be a screw, as shown in the drawings, so that the rotative position of the disc can be set in the desired manner.

When the disc 160 is in its normal or unactuated position where it is held by the spring 161 its periphery 164 is engaged by the lower end portion of the lower arm or lever 150 so that the upper arm of the lever 150 is held in with the stop 152 in engagement with the shoulder 153. A notch or recess 165 is provided in the periphery of the control disc so that when the disc is rotated against the spring 161 a predetermined amount the lower end of the lever arm normally riding on the periphery of the disc is free to drop or move in toward the center of the disc or to the position shown in dotted lines in Fig. 10, causing the stop 152 to be disengaged from the shoulder 153.

In accordance with our invention movement of the control disc to the position last mentioned is gained through rotation of the drill string S in excess of a predetermined speed for a given length of time. To actuate the control disc 160 two like centrifugal members or weights 170 are mounted on pivot pins 171 offset in diametrically opposite directions from the central axis of the mechanism. Each centrifugal weight 170 operates a pinion 172 concentric with its mounting and the two pinions 172 mesh with and drive a central gear 173 fixed on a tubular shaft 174 which extends upwardly from the centrifugal weights to a point a short distance below the control disc 160.

A core or block 180 is fixed on the upper end portion of the shaft 174. A compression spring 181 acts between one of the side plates 15 and the block 180 to normally urge the block in the direction opposite to that in which the control disc is urged by the spring 161. The spring 181 is considerably heavier or stronger than the spring 161 and is sufficiently strong to assure retraction of the centrifugal weights 170 to the position shown in Fig. 15, through the mechanical connection provided between the block 180 and the weights 170. With the mechanism thus far described it will be apparent that when the mechanism is rotated at a sufficient rate of speed the weights 170 will move out as indicated by the arrows in Fig. 15, causing the shaft 174 to rotate and, in turn, causing the block 180 to rotate against the resistance of the spring 181.

A latch 183 is carried on the block 180 by a pivot pin 184 and has an upwardly projecting dog 186 normally bearing against the periphery 164 of the control disc. The latch 183 is normally urged by a spring 185 so that the dog 186 bears inwardly against the periphery of the control disc and the parts are arranged and related so that the dog 186 bears on the periphery 164 of the control disc at a point well removed from the notch 165 in the control disc when the parts are at rest or in the normal position shown in Figs. 13 and 14 of the drawings.

When the block 180 on the shaft 174 is rotated by the action of the centrifugal weights 170, as above described, the dog 186 moves along the periphery of the control disc toward the notch 165. When the speed of rotation reaches a given value the centrifugal force generated by the weights 170 will be sufficient to cause the dog 186 to move along the periphery of the control disc to a position where it drops into the notch 165.

Through the operation just described it will be apparent that the drill string can be brought up to a given speed of rotation in a manner to set up centrifugal force in the mechanism which causes the latch 183 to engage the control disc 160 so the control disc is moved to allow the main stop lever to operate so that the main stop is released, all with the result that the mechanism is thus released to start operation or to start generating vibrations or signals.

We provide the time delay means $E^3$ for the centrifugal control just described so that the mechanism is not tripped or put into action every time the drill string S may be momentarily brought up to the predetermined speed necessary to cause the action just described. The time delay may be any suitable mechanism that will operate to retard the action of the mechanism just described. In the drawings we show a simple dash-pot type of control to effect the desired time delay. The time delay is best seen in Fig. 19 where it will be observed that each centrifugal weight 170 has a cylinder 190 formed in it facing the other weight and each cylinder carries a piston 191. A connecting rod 192 extends from the piston in each weight to the other weight where it is pivotally held on a pivot pin 171. The other ends of the cylinders are closed except for small escapement openings 194.

The entire mechanism just described is submerged in a bath or body of lubricating oil with the result that when centrifugal force tends to swing the weights 170 out the pistons 191 move out in the cylinders through the openings 194. By making the openings 194 of suitable size relative to the fluid employed in the mechanism the desired time delay or retarding action can be obtained. It is to be observed that the time delay acts not only to retard outward movement of the weights but also inward movement of weights under the influence of the spring 181 and consequently delays action of the mechanism in both directions.

The timer $E^4$ is incorporated in the mechanism to be set in motion or into operation when the main stop is released and serves to time or coordinate actions of the various elements which require timed cooperation or synchronism. In practice the timer may vary widely in form and construction. However, we prefer to employ a Geneva type movement mechanism since such a mechanism gives the desired action. The timer mechanism shown in Figs. 8 and 9 of the drawings involves, generally, a pin-wheel 200 mounted on a shaft 201 driven from the motor drive shaft 95, and a star-wheel 202 on a shaft 203. In practice any suitable driving connection can be provided between the motor shaft 95 and the shaft 201 of the timer. In the arrangement illustrated we show a bevel gear drive 204 from the shaft 95 to a series of gears 206 carried by one of the side plates which transmit motion through gears to the shaft 201, so that when the mechanism is in operation the shaft 201 rotates constantly.

The star-wheel 202 has four equally spaced concave recesses 210 in its periphery and radial notches 211 extending inward from its periphery and located between the recesses. The notched portions extend axially beyond the recesses for proper cooperation with the pin-wheel. The pin-wheel involves a disc having a curved peripheral portion 212 fitting the contour of the recesses 210 and it has two axially projecting pins 213 spaced apart in the manner clearly shown in Figs. 8 and 9. The shafts 201 and 203 are spaced apart and the parts just described are proportioned and related so that when the entire mechanism is in its normal position the parts are positioned as shown in Fig. 8 with the pins 213 at the mouths of two adjacent notches 211.

When the mechanism starts to operate, that is, when the shaft 201 starts to turn, one of the pins moves away from the star-wheel while the other pin 213 moves in toward the center of the star-wheel, reaches a position adjacent the bottom of the notch in the star-wheel, and then proceeds to move out in that notch in the star-wheel and finally leaves the star-wheel. In the course of this movement the star-wheel is rotated through 90°. As the pin-wheel continues to turn its peripheral part 212 enters one of the recesses in the star-wheel, thus locking the star-wheel against movement while the pin wheel continues to turn. This condition will prevail until one of the pins again enters a notch in the star-wheel, at which time the curved part 212 of the pin-wheel has moved out of the recess and the said pin picks up the star-wheel and carries it around 90° in the manner hereinabove described. With the mechanism thus provided one rotation of the pin-wheel causes movement of the star-wheel through an angle of 180° in two equal steps each of 90°, and with an interval of rest between the two movements.

The timer mechanism just described is operatively connected with the control means of the vibrator so that upon the first movement of the star-wheel the rod of means C is moved down so that the tip 75 cooperates with the head of the plumb-bob to remain in that position or in that engagement until the star-wheel makes its final movement, whereupon the rod is moved up or lifted freeing the tip 75 from the head of the plumb-bob. This connection, as shown in the drawings, involves a crank disc 220 carried on a shaft 221. A crank pin 222 projects from the crank disc and engages between the spaced lugs 85 on the operating sleeve 80 shown in Figs. 20 and 21. A gear 225 is fixed on the shaft 203 with the star-wheel and drives an idler gear 226 which meshes with and drives a gear 227 fixed on the shaft 221.

The parts just described are related and proportioned so that when the star-wheel makes its initial movement through 90° the crank disc, and consequently the crank pin 222, is moved through 180° or from an up position, as shown in Fig. 8, to a down position as shown in Fig. 9. The crank pin being engaged between the spaced lugs 85 thus moves the operating sleeve 80 to a down position, causing the rod 67 to be moved down so that the tip on its lower end cooperates with the head of the plumb-bob, all as above described.

During the period that the star-wheel remains idle between its two movements the crank pin remains down and the rod 67 is held down. When the star-wheel makes its final movement through 90° the crank disc 220 is moved through 180° returning the crank pin 222 to the up position shown in Fig. 8.

With the particular arrangement and proportioning of parts illustrated the main stop engages the mechanism at a point that is at shaft 137, where a considerable number of turns or revolutions are made for each single turn or revolution of the pin-wheel. It is to be observed that the general gear train hereinabove described is such that speed is gained as movement progresses through the mechanism so that when the main stop releases the mechanism the vibrator operates at a substantial speed while the pin-wheel of the timer makes but one revolution.

The disengagement of the main stop $E^1$ has been described. However, it is necessary to maintain the main stop disengaged or in a released position so that it does not re-engage before a complete cycle of operation is finished. The timer is employed to accomplish this. In the preferred arrangement the bearing block 151 which rotatably supports or forms the pivot for the lever 150 of the main stop means is eccentrically mounted on a shaft 250. The shaft 250 carries a gear 251 which meshes with the gear 225 on the star-wheel shaft 203 and these parts are proportioned so that when the mechanism is in the normal position the bearing block is in an in position as shown in Figs. 8 and 10, but during the first movement of the star-wheel the bearing block is moved through 180° or to an out position. In Fig. 11 the bearing block is shown moved through 90°. The lever of the main stop remains out or disengaged while the star-wheel remains at rest between its two movements. When the star-wheel makes its final movement the bearing block 151 is rotated through 180° bringing it back to its normal in position, and thus re-establishing the stop 152 in position to cooperate with the shoulder 153.

To reset the mechanism for a subsequent operation the lever 150 when moved by the eccentric or bearing block 151 moves down as well as out and in moving down its lower end strikes the dog 186 of latch 183. The latch is thus swung about pivot 184 against resistance of spring 185 and the dog 186 moves out away from the disc 160 so the periphery of the disc can pass behind the dog and the lever 150. The disc is returned by spring 161 and the disc is stopped by stop 163.

From the foregoing description it will be apparent that we have provided a compact, self-contained mechanism Y that can be advantaneously used on or in connection with the drill string S and when it is used in such connection its angle will correspond with the adjacent parts, for instance, with that of the tool T that may be below it. During normal drilling operations the rotation of the drill string and the corresponding rotation of the mechanism Y causes the power means to be energized or, in other words, causes the energy created through the inertia mechanism to be stored in the spring units. When it is desired to obtain a reading, for instance, to determine the inclination of the mechanism Y or of a tool T in connection therewith it is merely necessary for the operator to rotate the string S up to the speed necessary to trip the mechanism as above described, and to maintain it at that speed long enough to overcome the time delay introduced by reason of the means $E^3$. When this has been done the operator can bring the drill string to rest and immediately upon bringing the parts to rest the plumb-bob takes a truly perpendicular or vertical position, whereas the mechanism generally, and particularly the casing 14 guiding the tip of the rod 67, will be at whatever angle the tool T is. If the tool and, therefore, the mechanism, is perpendicular the head of the plumb-bob will stop the rod 67 so that the arm of the vibrator is of maximum length, and in proportion as the mechanism is inclined the rod 67 will move down and the arm of the vibrator will be shortened.

It will be obvious that there is a direct relationship between the inclination of the mechanism relative to the plumb-bob and the length of the arm 59 of the vibrator. Further, it will be obvious that the arm 59 with its mass 60 acts as a pendulum in controlling the rate at which the escapement is driven by the power delivered to it from the power means through the mechanism above described. As the pendulum arm 59 is shortened the speed of operation of the escapement is increased and for any particular positioning of the arm 59 there will be a rate at which the escapement mechanism will operate. As the escapement mechanism operates the vibrations or signals are set up due to the strikers 64 engaging the sprocket wheel and these vibrations are picked up at the top of the well, preferably through the drill string S, although they may be picked up from other parts or by any suitable means. The operator by observing the rate at which the signals are emitted or, in other words, by observing the rapidity of the vibrations, is advised as to the angle of the instrument at the bottom of the well and he is advised of this a very short time after he stops rotation of the drill pipe, since the mechanism is set into operation immediately following the predetermined rotation of the drill pipe above described. If a second or successive reading is desired at the same location it is merely necessary for the operator to bring the drill string to the desired speed for the proper length of time and then bring it to rest, all as above described.

From the foregoing description it will be apparent that the outstanding advantage of the apparatus that we have provided is that it is incorporated with standard drilling equipment so that repeated readings can be obtained, in fact, so that readings can be obtained whenever desired in the course of drilling at very short intervals of time, without the necessity of withdrawing the drilling string or of running instruments into and out of the hole. Furthermore, it is highly significant that by our invention we have eliminated entirely photograrhic devices, electrical devices, or like delicate instruments for operation in a well bore where conditions make such devices highly unsatisfactory.

Having described only typical preferred forms of apparatus and embodying our invention, we do not wish to be limited or restricted to the specific details herein set forth, but wish to reserve to ourselves any variations or modifications that may appear to those skilled in the art and fall within the scope of the following claims:

Having described our invention, we claim:

1. Apparatus for determining inclination of a well bore including a string of drill pipe, a tool, and a wholly mechanical mechanism connected in the string adjacent the tool and including a variable sound generating vibrator, power means driving the vibrator, an adjustment control governing the vibrator and responsive to the angular position of the mechanism, and a centrifugal master control governed by rotation of the string and initiating operation of the vibrator.

2. A well drilling string including a string of drill pipe, a tool, and a mechanism connected in the string adjacent the tool generating a signal to indicate inclination of the tool and including a variable vibrator, power means driving the vibrator, means for varying the vibrator governed by the angular position of the mechanism, and a master control initiating operation of the vibrator and governed by a predetermined movement of the string, the vibrator including an escapement mechanism having an escapement wheel and spaced oscillating strikers that cooperate with the escapement.

3. Apparatus for determining inclination of a well bore including a string of drill pipe, a tool, and a mechanism connected in the string adjacent the tool and including a variable frequency vibrator, means controlling the frequency of the vibrator governed by the angular position of the mechanism, power means driving the vibrator, and a centrifugal control governing the power means through a stop mechanism and acting in response to rotation of the string.

4. A well drilling string including a string of drill pipe, a tool, and a mechanism connected in the string adjacent the tool and including a variable vibrator, means varying the vibrator and governed by the angular position of the mechanism, mechanical power means driving the vibrator, and a control initiating operation of the vibrator and responsive to movement of the string, the power means including a spring motor energized by operation of the drilling string.

5. A well drilling string including a string of drill pipe, a tool, and a mechanism connected in the string adjacent the tool and including a variable vibrator, means varying the vibrator responsive to the angular position of the mechanism, power means driving the vibrator, and a control for the vibrator governed by predetermined movement of the string, the power means including a drive spring and for force generating means actuated by momentum generated by operation of the string applying force to the spring.

6. Apparatus for determining inclination of a well bore including a string of drill pipe, a tool, and a mechanism connected in the string adjacent the tool and including a variable vibrator, power means driving the vibrator, means varying the vibrator responsive to the angular position of the mechanism, and a control for starting operation of the vibrator and governed by predetermined movement of the string and including, a main stop for the power means, and a control for the stop including, a centrifugally operated element rendering the stop effective when the string is rotated.

7. Apparatus for drilling and indicating and indicating inclination of a well bore including a string of rotary drill pipe, a drilling tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop normally holding the power means inactive, a control for the stop including, a centrifugally operated element having a normal position from which it is operated by rotation of the string and which operates the stop to release the power means when the string is stopped following rotation, and time delay means retarding movement of said element to the unactuated position.

8. A well drilling string including a string of drill pipe, a tool, and a mechanism connected in the string adjacent the tool and including a variable mechanical sound generating vibrator, power means driving the vibrator, means varying the vibrator governed by the angular position of the mechanism, and a mechanical control for the vibrator governed by rotation of the string and including a main stop controlling the drive of the vibrator by the power means and a timer stopping operation of the vibrator after a predetermined operation thereof.

9. A well drilling string including a string of drill pipe, a tool, and a mechanism connected in the string adjacent the tool and including a variable vibrator, power means driving the vibrator, means varying the vibrator responsive to the angular position of the mechanism, and a control for the vibrator governed by predetermined movement of the string and including a main stop controlling the drive of the vibrator by the power means, an element operated by centrifugal force when the string is rotated and controlling the stop so the vibrator is operated only when the pipe is at rest, and a timer stopping operation of the vibrator after a predetermined operation thereof.

10. A well drilling string including a string of drill pipe, a tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop controlling the drive of the vibrator by the power means, means for releasing the stop including, an element operated from an unactuated position by centrifugal force when the string is rotated and releasing the main stop upon return to the unactuated position, and a timer stopping operation of the vibrator after a predetermined operation thereof.

11. A well drilling string including a string of drill pipe, a tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop controlling the drive of the vibrator by the power means, means for releasing the stop including, an element operated from an unactuated position by centrifugal force when the string is rotated and releasing the main stop when said element returns to the unactuated position following operation, and a timer stopping operation of the vibrator upon re-engagement of the stop.

12. A well drilling string including a string of drill pipe, a tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop controlling the drive of the vibrator by the power means, means for releasing the stop including, an element operated from an unactuated position by centrifugal force when the string is rotated and releasing the main stop when said element returns to the unactuated position following operation, and a timer stopping operation of the vibrator by re-engaging the stop after predetermined operation of the vibrator.

13. A well drilling string including a string of drill pipe, a tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop controlling the drive of the vibrator by the power means, an element from an unactuated position by centrifugal force when the string is rotated and releasing the main stop when said element returns to the unactuated position following operation, time delay means retarding return of the said element to the unactuated position when the string is stopped following rotation, and a timer stopping the vibrator after predetermined operation.

14. A well drilling string including a string of drill pipe, a tool, and a mechanism connected in the string adjacent the tool and including a variable vibrator, power means driving the vibrator, means varying the vibrator governed by the angular position of the mechanism, and a control for the vibrator governed by predetermined movement of the string and including a main stop controlling the drive of the vibrator by the power means, means for releasing the stop so the vibrator operates including, an element operated from a normal position by centrifugal force when the string is rotated, time delay means retarding movement of the said element, and a timer stopping operation of the vibrator after predetermined operation thereof.

15. A well drilling string including a string of drill pipe, a tool, and a mechanism connected in the string adjacent the tool generating a signal to indicate inclination of the tool and including a variable vibrator, means varying the vibrator and governed by the angular position of the mechanism, power means driving the vibrator and a control for the vibrator governed by predetermined movement of the string, the vibrator including an escapement mechanism having an escapement wheel and spaced oscillating strikers that cooperate with the escapement.

16. A well drilling string including a string of drill pipe, a tool, and a mechanism connected in the string adjacent the tool and including a variable vibrator, means varying the vibrator and governed by the angular position of the mechanism, mechanical power means driving the vibrator and a control for the vibrator governed by predetermined movement of the string, the vibrator including an adjustable oscillating control arm, the power means including a spring motor charged by movement of the drilling string.

17. A well drilling string including a string of drill pipe, a tool, and a mechanism connected in the string adjacent the tool and including a variable vibrator, means varying the vibrator and governed by the angular position of the mechanism, power means driving the vibrator and a control for the vibrator governed by predetermined movement of the string, the vibrator including an escapement mechanism having an escapement wheel and spaced oscillating strikers that cooperate with the escapement, the power means including a drive spring and force generating means actuated by momentum generated by operation of the string applying force to the spring.

18. A well drilling string including a string of drill pipe, a tool, and a mechanism connected in the string adjacent the tool generating a signal to indicate inclination of the tool and including a variable vibrator, power means driving the vibrator, means varying the vibrator and governed by the angular position of the mechanism, and a control for the vibrator governed by predetermined movement of the string and including an element operated by centrifugal force when the string is rotated, the vibrator including an escapement mechanism having an escapement wheel and spaced oscillating strikers that cooperate with the escapement.

19. A well drilling string including a string of drill pipe, a tool, and a mechanism connected in the string adjacent the tool and including a variable vibrator, power means driving the vibrator, means varying the vibrator and governed by the angular position of the mechanism, and a control for the vibrator governed by predetermined movement of the string and including a main stop controlling the drive of the vibrator by power means, means for releasing the stop so the vibrator operates including an element operated from a normal position by centrifugal force when the string is rotated, a timer stopping operation of the vibrator, and drive means for the timer, the vibrator including an escapement mechanism having an escapement wheel and spaced oscillating strikers that cooperate with the escapement.

20. A well drilling string including a string of drill pipe, a tool, and a mechanism connected in the string adjacent the tool and including a variable vibrator, means varying the vibrator and governed by the angular position of the mechanism, power means driving the vibrator and a control for the vibrator governed by predtermined movement of the string and including a main stop controlling the drive of the vibrator by the power means, means for releasing the stop so the vibrator operates including an element operated from a normal position by centrifugal force when the string is rotated, a timer stopping the vibrator after predetermined operation, and drive means operating the timer, the vibrator including an adjustable oscillating control arm.

21. A well drilling string including a string of drill pipe, a tool, and a mechanism connected in the string adjacent the tool and including a variable vibrator, means varying the vibrator and governed by the angular position of the mechanism, power means driving the vibrator, and a control for the vibrator governed by rotation of the string and including a main stop, means for releasing the stop including an element operated by centrifugal force when the string is rotated, a timer controlling the vibrator, and a drive operating the timer the vibrator including an escapement mechanism having an escapement wheel and spaced oscillating strikers that cooperate with the escapement.

22. A well drilling string including a string of drill pipe, a tool, and a mechanism connected in the string adjacent the tool and including a variable vibrator, means varying the vibrator and governed by the angular position of the mechanism, power means driving the vibrator and a control for the vibrator governed by rotation of the string and including an element operated by centrifugal force when the string is rotated, the vibrator including an adjustable oscillating control arm, the power means including a power storing means charged by operation of the drilling string.

23. A well drilling string including a string of drill pipe, a tool, and a mechanism connected in the string adjacent the tool and including a variable vibrator, means varying the vibrator and governed by the angular position of the mechanism, power means driving the vibrator and a control for the vibrator governed by rotation of the string and including an element operated by centrifugal force when the string is rotated, the vibrator including an escapement mechanism having an escapement wheel and spaced oscillating strikers that cooperate with the escapement, the power means including a drive spring and power generating means actuated by momentum generated by operation of the string applying force to the spring.

24. A well drilling string including a string of drill pipe, a tool, and a mechanism connected in the string adjacent the tool and including a variable vibrator, means varying the vibrator and governed by the angular position of the mechanism, power means driving the vibrator and a control for the vibrator governed by rotation of the string and including a main stop, means for releasing the stop including an element operated by centrifugal force when the string is rotated, a timer controlling the vibrator, and means driving the timer the vibrator including an adjustable oscillating control arm, the power means including a power storing means charged by operation of the drilling string.

25. A well drilling string including a string of drill pipe, a tool, and a mechanism connected in the string adjacent the tool and including a variable vibrator, means varying the vibrator and governed by the angular position of the mechanism, power means driving the vibrator, and a control for the vibrator governed by rotation of the string and including a main stop, means for releasing the stop including an element operated by centrifugal force when the string is rotated, and a timer controlling the vibrator, the vibrator including an escapement mechanism having a sprocket wheel and spaced oscillating strikers that cooperate with the sprocket, the power means including a drive spring and means actuated by momentum generated by operation of the string applying force to the spring.

26. A well drilling string including, a string of drill pipe, a tool, and a mechanism connected in the string adjacent the tool generating a signal to indicate inclination of the tool and including a vibrator, means varying the action of the vibrator governed by the angular position of the mechanism, and a control for the vibrator governed by predetermined movement of the string, the vibrator including an escapement mechanism having an escapement wheel and spaced oscillating strikers that cooperate with the escapement.

27. A mechanism operable in a well including, a rotatable body, a variable vibrator including an escapement mechanism and an oscillating control arm for the escapement mechanism, the escapement mechanism including an escapement wheel and an oscillating element with striker pins cooperating with the wheel, power means driving the vibrator means whereby the action of the vibrator is governed by the angular position of the body when at rest, and a control for the vibrator located in the body and governed by rotary movement of the body.

28. A mechanical mechanism operable in a well including, a rotatable body, a variable vibrator, means whereby the action of the vibrator is governed by the angular position of the body when at rest, a spring motor for the vibrator energized by movement of the body, and a control for the vibrator located in the body and governed by rotary movement of the body in a predetermined manner.

29. A mechanism operable in a well including, a rotatable body, a variable vibrator, power means for the vibrator energized by rotation of the body, means whereby the action of the vibrator is governed by the angular position of the body when at rest and including a plumb bob and a control rod operatively connected with the vibrator and cooperating with the plumb bob, and a control for the vibrator located in the body and governed by rotary movement of the body.

30. A mechanism operable in a well including, a rotatable body, a variable vibrator, means whereby the action of the vibrator is governed by the angular position of the body when at rest power means for the vibrator energized by movement of the body, and a control for the vibrator located in the body and governed by rotary movement of the body, the power means including a spring and means actuated by inertia and communicating force to the spring.

31. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a centrifugally operated latch.

32. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a centrifugally operated latch and a time delay means.

33. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a stop mechanism controlling the power means, and a centrifugally operated latch controlling the stop mechanism.

34. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a stop mechanism controlling the power means, a centrifugally operated latch controlling the stop mechanism, and a time delay means retarding operation of the latch.

35. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a stop mechanism controlling the power means, a shiftable member operated when the speed of the body exceeds a predetermined value, a timer timing the operation of the vibrator, and a drive operating the timer.

36. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a stop mechanism controlling the power means, a centrifugally operated latch mechanism controlling the stop mechanism, a timer synchronizing the operation of the vibrator and the engagement of the latch mechanism, and means driving the timer.

37. A mechanism operable in a well including, a rotatable body, a variable vibrator, power means driving the vibrator, means whereby the action of the vibrator is governed by the angular position of the body when at rest, and a control for the vibrator located in the body and governed by rotary movement of the body including a stop mechanism controlling the power means, a centrifugally controlled latch controlling the stop mechanism, a timer timing the operation of the vibrator, and a drive for the timer.

38. A mechanism operable in a well including, a rotatable body including a fluid conducting shell with ends for connecting the mechanism in a well string to communicate torque, a variable vibrator, power means driving the vibrator, means whereby the action of the vibrator is governed by the angular position of the body when at rest, and a control for the vibrator located in the body and governed by rotary movement of the body, including a stop mechanism controlling the power means, a centrifugally controlled latch controlling release of the stop mechanism to put the vibrator into operation, a timer timing the operation of the vibrator and means driving the timer.

39. A mechanism operable in a well including, a rotatable body, a variable vibrator including an escapement mechanism and an oscillating control arm for the escapement mechanism, power means driving the vibrator, means whereby the action of the vibrator is governed by the angular position of the body when at rest, and a control for the vibrator located in the body and governed by rotary movement of the body including a stop mechanism controlling the power means, a centrifugally controlled latch controlling release of the stop mechanism to put the vibrator into operation, a timer stopping operation of the vibrator after a predetermined operation thereof, and means driving the timer.

40. A mechanism operable in a well including, a rotatable body, a variable vibrator, power means driving the vibrator, means whereby the action of the vibrator is governed by the angular position of the body when at rest and including a plumb bob and a control rod cooperating with the plumb bob, and a control for the vibrator located in the body and governed by rotary movement of the body including a stop mechanism controlling the power means, a centrifugally controlled latch controlling release of the stop mechanism to start operation of the vibrator, a timer timing the operation of the vibrator, and drive means for the timer.

41. A mechanism operable in a well including, a rotatable body, a variable vibrator, means whereby the action of the vibrator is governed by the angular position of the body when at rest, power means for the vibrator energized by movement of the body, and a control for the vibrator located in the body and governed by rotary movement of the body including a stop mechanism controlling the power means, a centrifugally controlled latch controlling release of the stop mechanism to start operation of the vibrator, a timer timing the operation of the vibrator, and means driving the timer.

42. In well apparatus, a signaling device, a control for the signaling device, a well tool, a single string extending into the well and carrying and operating the tool in the well and carrying the signaling device in the well, the control being operable by movement of the string, power means for the signaling device including a spring motor energized by movement of the string and receiver at the upper end portion of the string receiving signals from said device.

43. In well apparatus, a signaling device, a control for the signaling device, a well tool, a single string extending into the well and carrying and operating the tool in the well and carrying the signaling device in the well, the control being operable by rotation of the string, power means for the signaling device energized by rotation of the string and a receiver at the upper end portion of the string receiving signals from said device.

JOHN S. GOODWIN.
PHILLIP CAMPBELL.

REFERENCES CITED

The following references are of record in the file of this patent:

UNITED STATES PATENTS

| Number | Name | Date |
|---|---|---|
| 547.694 | Tibbals | Oct. 8. 1895 |
| 1,313,367 | Anschutz-Kaempfe | Aug. 19, 1919 |
| 1,751 594 | Morgan | Mar. 25, 1930 |
| 1,938,873 | Stone et al. | Dec. 12, 1933 |
| 1,979,481 | Lynch et al. | Nov. 6, 1934 |
| 1,981,665 | Rieber | Nov. 20, 1934 |
| 2,134,808 | Winn | Nov. 1, 1938 |
| 2.190,950 | Potapenko | Feb. 20, 1940 |
| 2,198,834 | Nardone | Apr. 30, 1940 |
| 2,255,721 | Mattingly et al. | Sept. 9, 1941 |
| 2,309,877 | Weinstein et al. | Feb. 2, 1943 |
| 2,309,905 | Irwin et al. | Feb. 2, 1943 |
| 2,380,520 | Hossler | July 31, 1945 |
| 2,388,141 | Harrington | Oct. 30, 1945 |
| 2 412 976 | Emerson et al. | Dec. 24, 1946 |
| 2,425,868 | Dillon | Aug. 19, 1947 |
| 2,433,746 | Doll | Dec. 30, 1947 |